Figure 1:
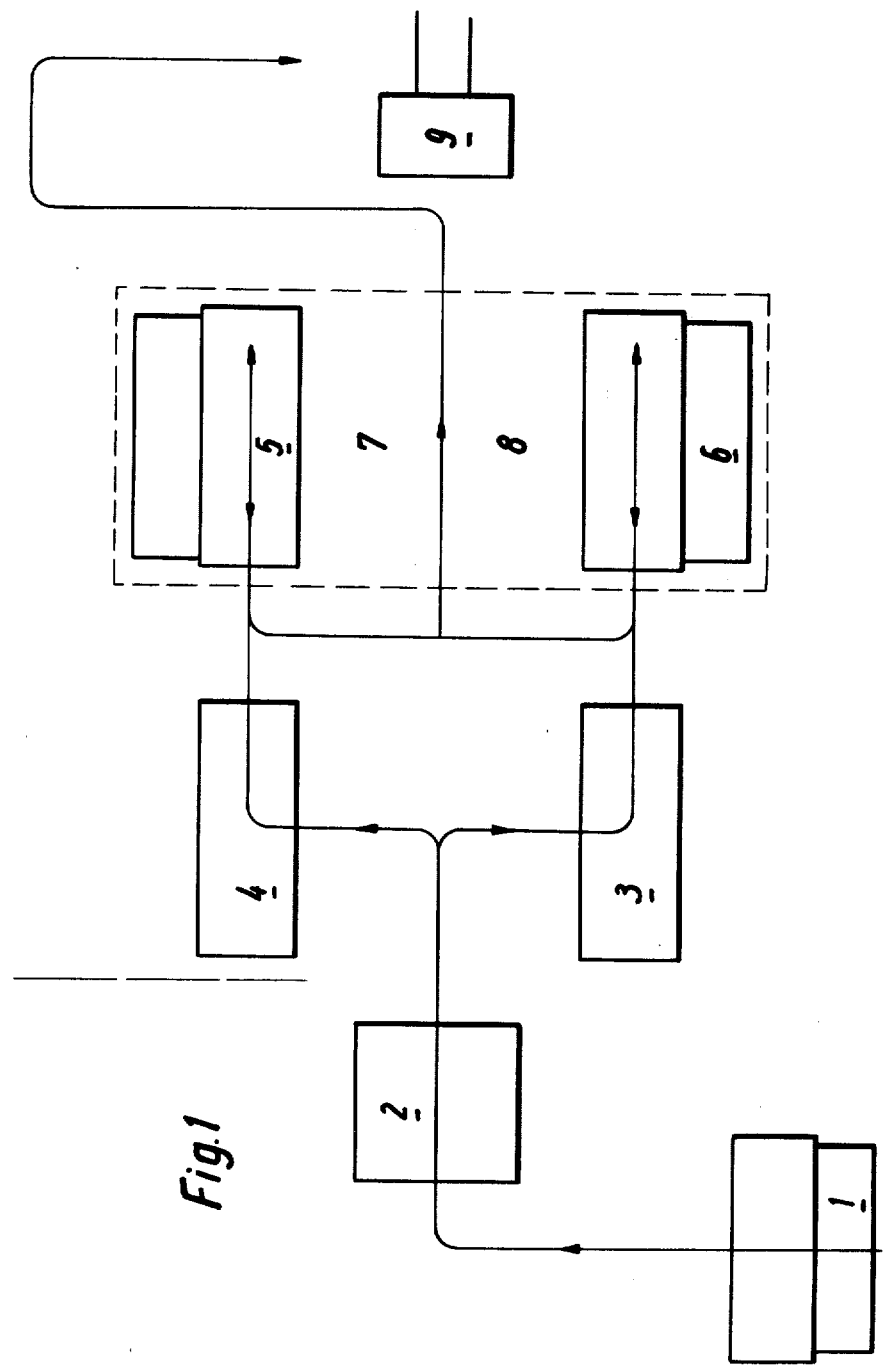

United States Patent

Ries et al.

[15] 3,686,932
[45] Aug. 29, 1972

[54] METHOD AND AN APPARATUS FOR EXAMINING THE SEAMS OF WELDED PIPES

[72] Inventors: Karl Ries, Hagdorn 61; Helmut Wimmer, Jacobstrasse 39, Mulheim/Ruhr; Theodor Biller, Herzogstrasse 35, Dusseldorf, all of Germany

[22] Filed: Aug. 5, 1970

[21] Appl. No.: 61,387

[30] Foreign Application Priority Data

Aug. 6, 1969  Germany..........P 19 39 933.8

[52] U.S. Cl..................73/67.5 R, 73/67.8, 250/52, 250/53
[51] Int. Cl.............................................G01n 29/04
[58] Field of Search............................73/67.5–67.9; 250/52, 53, 65 R

[56] References Cited

UNITED STATES PATENTS 2,437,688  3/1948  Forsell........................250/53
3,213,677  10/1965  Maklary.....................73/67.9
3,483,739  12/1969  Gewartowski..............73/67.8

*Primary Examiner*—Richard C. Queisser
*Assistant Examiner*—John P. Beauchamp
*Attorney*—Burgess, Dinklage & Sprung

[57] ABSTRACT

A method and an apparatus for the examination of the welding seams of welded pipes, wherein after forming the seam it is subjected to an ultrasonic examination along the entire length in production flow, certain locations of potential problems giving off distinguishing signals. Thereafter X-ray films are brought into engagement with the pipe wall at the locations resulting in such distinguishing signals, and finally an X-raying of the pipe wall is effected at these locations, said method and said apparatus being characterized by the steps or means of initially signalling to a positioning means all locations of a pipe giving off distinguishing signals during an ultrasonic pre-scan and then, at an X-ray station, placing X-ray films onto a backing at these signalled locations before the pipe is moved over said backing so that X-raying can be effected at these locations.

5 Claims, 5 Drawing Figures

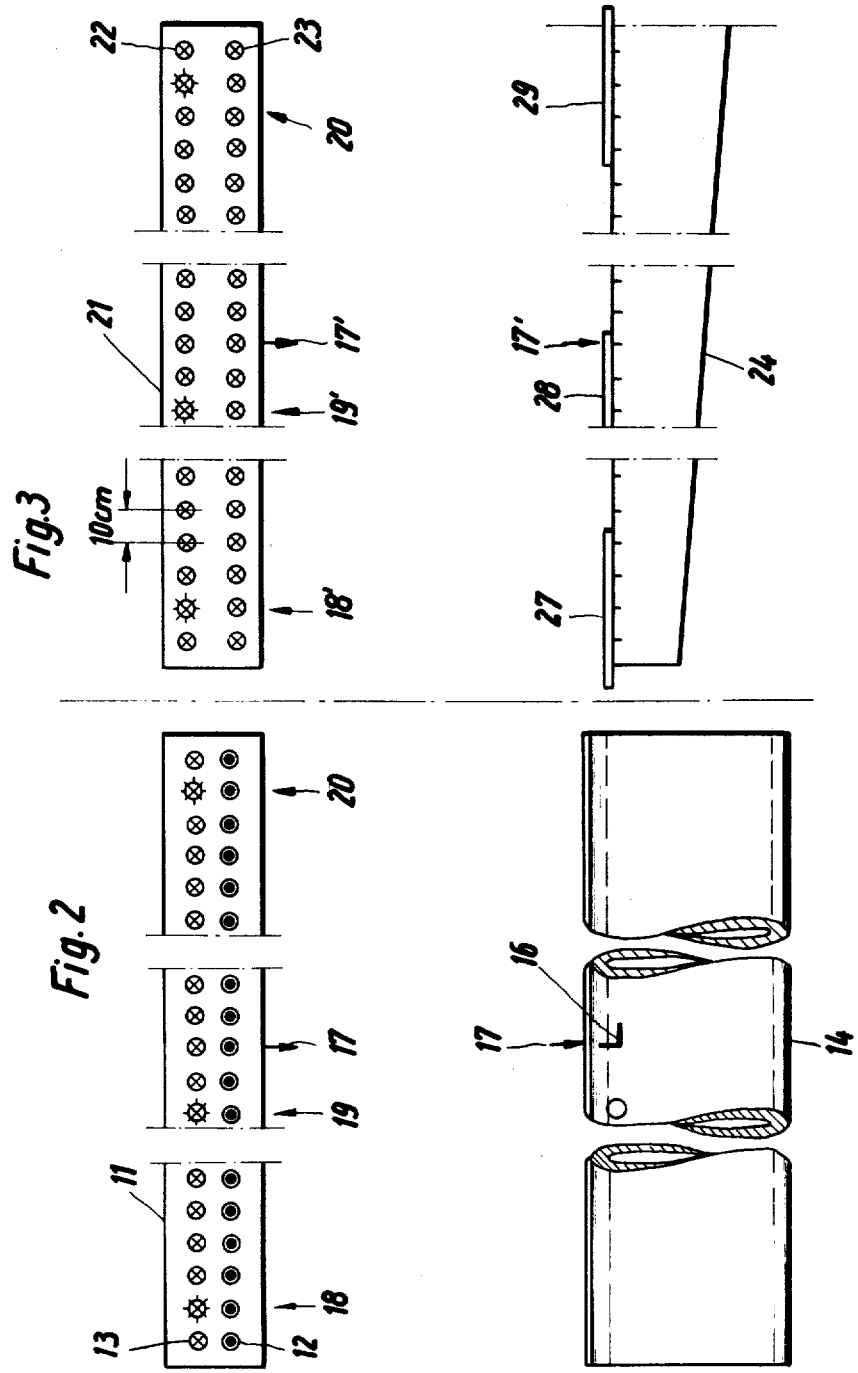

METHOD AND AN APPARATUS FOR EXAMINING THE SEAMS OF WELDED PIPES

This invention relates to a method of examining the seam of welded pipes, wherein after the formation of the welding seam it is subjected to an ultrasonic examination certain locations of potential problems giving off distinguishing signals. Thereafter, at the locations resulting in such distinguishing ultrasonic signals X-ray films are brought into engagement with the pipe wall and finally at these locations an X-raying of the pipe wall is effected. This invention furthermore relates to an apparatus for performing this method.

The quality of welded large-size pipes decisively depends on the quality of the welding seam. Therefore the clearance specifications require a full non-destructive examination of the welding seam at the manufacturing facilities where the large-size pipes are manufactured. A complete X-ray examination of the welding seam in the course of production flow, however, is hardly capable of being conducted, because X-ray pictures generally require much time until they are evaluated and are too costly. Therefore the more sensitive and mechanized and therefore quicker ultrasonic pulse examination of the entire weld seam as a preexamination has been introduced, as is well-known in the art. The X-ray pictures are limited to those locations indicated as potentially troublesome by giving off distinguishing signals in the ultrasonic examination and to the end portions of the welding seam, because these are not totally scanned by the mechanized ultrasonic examination. In this regard, the application of the films to the proper locations of the internal wall of the pipe resulted in great difficulties. When done manually it was cumbersome and therefore was time consuming. A method is also known by means of which the films are consecutively inserted at the locations to be X-rayed by means of an elongated arm containing a scale. This method is also very time-consuming. In view of the ever increasing output of modern large-size pipe manufacturing plants, the time factor is almost unbearable.

An object of the invention is to provide a method of the type set forth initially as well as an apparatus suited to perform such a method which permit a reduction of the time required for taking X-ray pictures so that they can also be taken in the course of the production flow even for relatively high speed modern large-size pipe rolling mills.

According to this invention in a method of the above referred to type first of all the positions of all locations resulting in a distinguishing ultrasonic signal during a pre-seam of a pipe are transmitted to a positioning means of the X-ray station and then the X-ray films are placed on a backing of the X-ray station at these transmitted locations before the pipe is moved over the backing so that the X-raying can be effected at these positions.

In the method according to this invention, the X-ray station can be prepared for X-raying before the pipe to be X-rayed is moved into the X-ray station, namely by bringing all films into their position after signalling the positions to the positioning means according to the indication of the positioning means. While then subsequently the pipe is moved over these films and is X-rayed, the defect-prospective locations of the next pipe can already be signalled to the positioning means. The method according to this invention thus permits short operating times for the X-ray pictures.

The apparatus provided for performing the method is characterized by the fact that it has a first station in which the pipe is inserted after the ultrasonic examination or in which the pipe is examined by ultrasonics and a second down-flow station including means movable in axial direction of the pipe for X-raying, that both stations each have a strip arranged coextensive of the pipe and at least as long as the pipe to be examined and means which in both stations permit the same axial association of the pipe relative to the strip, that the two strips similarly are subdivided into a plurality of sections and each of the sections of the strip of the first station has a signal emitter and each of the sections of the strip of the second station has a signal receiver, the signal emitters and signal receivers of the respective sections being connected to one another electrically, and that in the second station a support arm for receiving and urging the film against the internal wall of the pipe is provided which extends along the length of the pipe and is arranged adjacent the strip in a position axially fixed relative to the strip in such a way that it is positioned within the pipe after moving the pipe into the second station.

Preferably each section of the strip of the second station has at least two signal receivers operable independently of one another.

According to a further object and feature of this invention, a rail is arranged in parallelism with the support arm on which at least one X-ray device is capable of being moved by means of a control capable of being programmed.

According to an advantageous embodiment of this invention, it is contemplated that with the ultrasonic examination device there is provided a spray gun and that an input device is arranged ahead of the X-ray device as viewed in direction of movement, including a strip which in its length and its division into a plurality of sections corresponds to the strip of the X-ray device, each section being provided with a switch from which a power line extends to the lamp of the corresponding section of the strip.

Finally, it is proposed according to this invention to arrange two or more X-ray apparatuses and possibly input devices in parallel behind a welding train.

Figure 4:
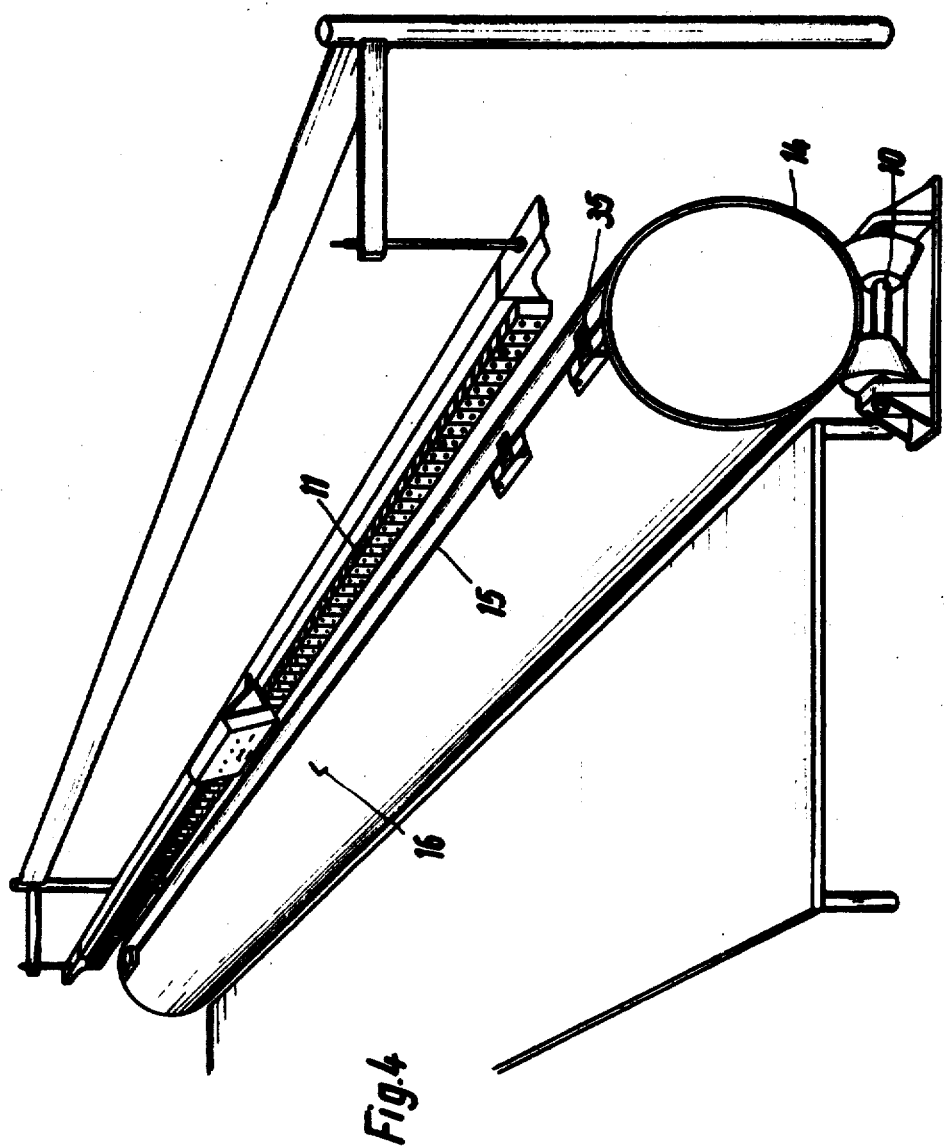
Figure 5:
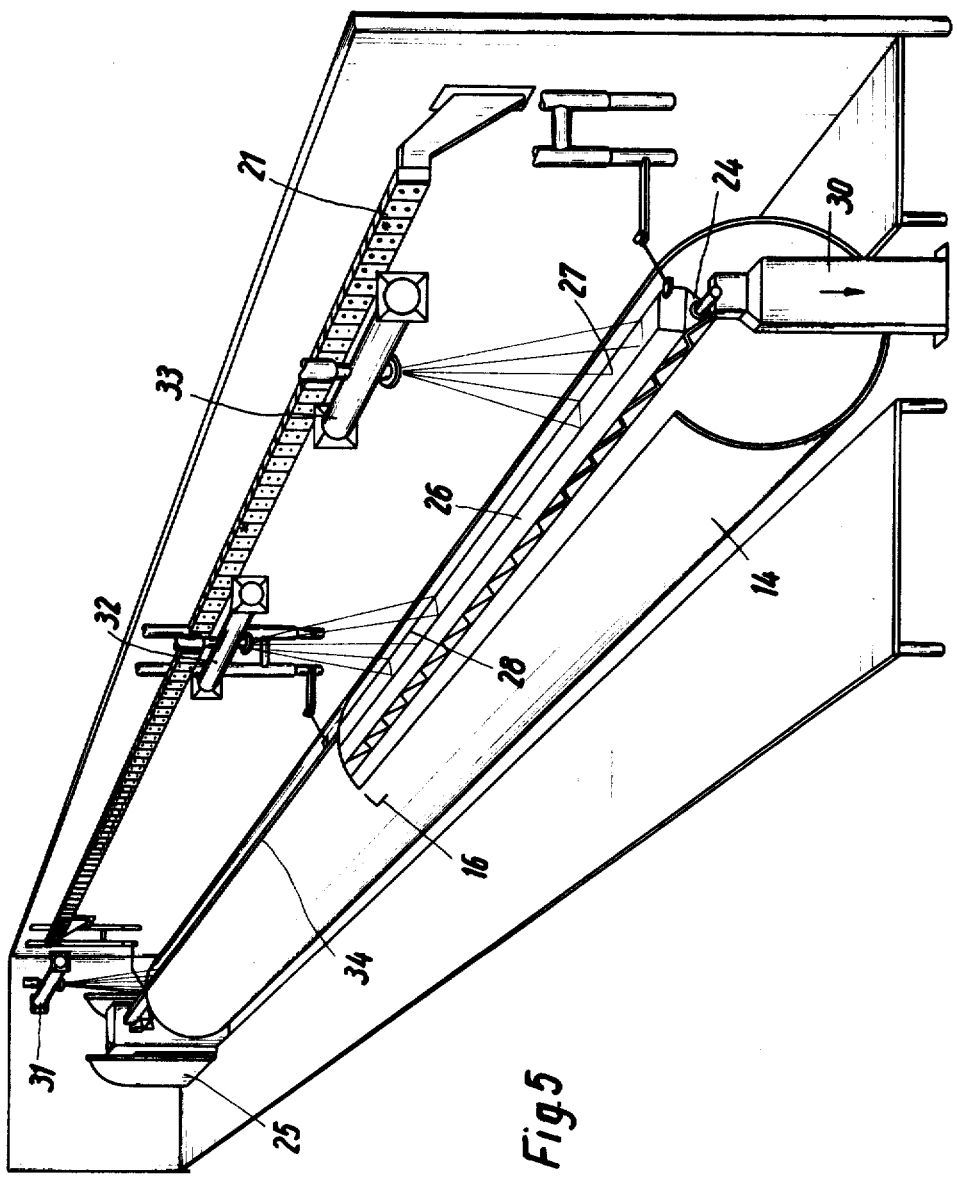

With the foregoing objects in view, together with such additional objects and advantages as may subsequently appear, the invention resides in the parts, and in the construction, combination and arrangements of parts disclosed, by way of example, in the following specification; reference being had to the accompanying drawings which form a part of said specification and wherein:

FIG. 1 is a diagrammatic illustration of the movement of a pipe through the various stations, FIG. 2 is a diagrammatic illustration of the first station including the input device, FIG. 3 is a diagrammatic illustration of the second station for X-raying, FIG. 4 is a perspective illustration of the first station including the input device, and FIG. 5 is a perspective illustration of the second station for X-raying.

After welding, the pipes are expanded and thereby internally calibrated. After expanding, a water pressure testing step is performed. Thereafter, the pipes are tested in the end portion test stand 1 at their end portions along the entire pipe circumference by ultrasonics for laminations and inclusions. After end portion testing, the pipes pass through the automatic ultrasonic test system 2. There all locations along the weld seams on the pipe 14 which emit a distinguishing ultrasonic signal are automatically marked by means of a paint spray gun. Now X-ray pictures must be taken of the marked spots of the weld seam. For doing so, two X-ray devices 5 and 6 arranged in parallel are provided, each of which is preceded by a first or preparation station 3 and 4, respectively including an input device. A common darkroom 7 including an automatic film developing machine is associated with the two X-ray devices 5 and 6. Furthermore, there is an evaluation room 8. After the X-ray test, the pipe leaves the X-ray device 5 or 6 and moves on to the release station 9 where the X-ray analysis is awaited. The capacity of this system is sufficient to prepare up to six X-ray pictures per pipe in addition to the pictures at the weld seam end portions within the cycle of only a few minutes. A strip 11 is arranged at the preparation station 3 and 4 in juxtaposed relationship to a roller bed 10. This strip has a length of about 41 feet corresponding to the longest pipe to be examined. It is divided into 125 sections of 10 cms each. Each section is provided with a switch acting as a signal emitter and with a control lamp. The switches together form a bank 12, the control lamps form a bank 13. In juxtaposed relationship to this strip 11, the pipe 14 is stopped, the weld seam of which has been denominated 15. It has a mark 16 generally midway which will come to a rest in the proximity of a particularly indicated section of the strip 11. In this way, the axial association between the pipe 14 and the strip 11 is determined. This section has been marked by the arrow 17 in FIG. 2. Subsequently, those switches of the bank 12 are operated which are positioned at the location of a paint mark on the pipe 14. Arrows 18, 19, and 20 show the operated switches in FIG. 2. When the switches are operated, the control lamps of the strip 11 associated with the switches are illuminated. The X-ray device 5 and 6 likewise has a strip 21 serving as a positioning means. Regarding its length and its division into 125 sections, it corresponds to the strip 11. The strip 21 is provided with two banks 22, 23 of lamps as signal receivers. Each section of the strip 21 has two superimposed lamps. When the switches 18, 19, 20 of the strip 11 are operated, the corresponding lamps 18', 19', 20' of the lamp bank 22 of the strip 21 are illuminated. In this way, the positions at which X-ray pictures are to be taken are signalled to the X-ray device 5, 6, 7, 8 before the pipe 14 enters the X-ray device 5, 6, 7, 8. The second lamp bank 23 of the strip 21 is provided for the purpose of receiving the X-ray positions for the following large-size pipe while the preceding pipe is still being tested.

In the X-ray device 5, 6, 7, 8, there is further provided a support arm 24 secured to a support structure 25. An inflatable rubber hose 26 is positioned on the support arm. As soon as the lamps 18', 19', 20' are illuminated, the operator can start to apply the X-ray films 28, 27, 29 to the hose 26 at the signalled positions. As soon as this work is done, the pipe 14 is automatically moved into the X-ray room. In doing so, it moves over the support arm 24 until the mark 16 is positioned opposite the mark 17'. Subsequently, the free end portion of the support arm extending out of the pipe is supported by an abutment 30. By depressing a pushbutton, the operator can now cause the hose 26 to inflate along its entire length, with the films being disposed on this hose. In this way, the films are pressed against the internal surface of the pipe. The sizes of the films in longitudinal direction of the pipe are much larger than the size of a section of the strip 21. A reliable image of a fault is thereby permitted even in case it is located at the border of a section.

A lead measuring tape 34 is placed in juxtaposed relationship to the weld seam on the pipe surface. It is provided for the purpose of permitting a non-confusible association between the X-ray picture and the respectively tested location of a pipe.

By the operation of the switches 18, 19, 20 the program is memorized for subsequent control of the automatic positioning of three X-ray devices 31, 32, 33 which are movable in longitudinal direction of the pipe along a rail (not illustrated). Concurrently with the operation of the inflatable rubber hose and the lowering mechanism for the measuring tape, the X-ray devices are moved into their X-raying positions. Now the exposing procedures are initiated from the control desk. If more than three X-ray pictures must be taken at one pipe, the X-ray tubes automatically move into their new X-raying positions after termination of the first exposing procedure.

Thereafter, the hose is automatically decompressed, and the lead measure is lifted up. The exposed films lie free and are lifted off the rubber hose 26 by the operator and are immediately conveyed to the darkroom through a conveyor belt. There the films are developed by means of an automatic developing machine. The films are passed on to the evaluation room 8 after being developed, where the critical weld seams are judged on the basis of the X-ray films. The analysis result is transmitted to the release station 9 where the X-rayed pipes are waiting. As a result of the reports, the pipes are either released or passed on to an appropriate after treatment.

The system described is merely an embodiment of the invention by way of example. It can be modified in various ways without departing from the spirit of the invention. For instance, automation can be enhanced even more by automatically also transmitting the locations which result in a signal in the ultrasonic test. This could be done for instance in such a way that the mark indication of the positions is effected on a recording carrier moved synchronously with the pipe, instead of on the pipe, for instance on a magnetic tape recorder or a slide register. The signals can automatically be scanned from the recorder and used for the operation of the lamps on the strip 21 as well as for the provisional controlling of the X-ray devices 31, 32, 33.

Thus, notwithstanding the illustrated use of the invention and the manner by which such use may be achieved, it is appreciated that changes and modifications will suggest themselves to others skilled in the art both for uses similar to those illustrated as well as for other uses. The invention, therefore, is not to be deemed to be limited to the exact mode of execution above disclosed by way of example, and it will be understood that the invention embraces all such changes and modifications in the parts, and in the construction, combination and arrangement of parts as shall come within the purview of the appended claims.

What is claimed is:

1. A method of examining the seams of welded pipes comprising the steps of subjecting said seam to an ultrasonic examination along its entire length in such manner that locations of potential problems give off a distinguishing signal, noting such locations, signalling such locations to an X-ray station before said pipes reach said station, positioning X-ray films at said station at spaced positions corresponding to the locations, advancing said pipes to said station so that its locations are in registry with the spaced positions where X-ray films have been provided, and X-raying said pipes at said locations.

2. A method according to claim 1, wherein said films are positioned on a backing, said pipes moving over said backing so that said X-rays are beamed from outside said pipes toward films inside said pipes.

3. An apparatus for examining the seams of welded pipes comprising a first station for receiving an ultrasonically pre-examined pipe whose locations of potential problems have been noted, a second station positioned downstream of said first station and provided with means movable in axial direction for the pipe for X-raying, each station having a strip arranged coextensive of the pipe and at least as long as the pipe to be examined, said pipe being marked whereby it may be positioned in both stations with the same axial association of the pipe relative to the strips, the two strips being subdivided into a plurality of sections and each of the sections of the strip of the first station having a signal emitter respectively connected to a signal receiver on each of the sections of the strip of the second station, the emitters being actuated in accordance with corresponding locations of said noted potential problems upon positioning the pipe at the first station, a support arm in the second station for receiving X-ray films positioned in accordance with locations indicated by the signal receivers, said support arm extending along the length of the pipe and being arranged adjacent the strip in a position axially fixed relative to the strip in such a way that it is positioned within the pipe after moving the pipe into the second station, and means for urging said support arm against the internal wall of a pipe in said second station.

4. An apparatus as defined in claim 3, wherein each section of the strip of the second station has at least two signal receivers operable independently of one another, one of said receivers being used to receive signals pursuant to which film is positioned for a pipe immediately to arrive in said second station, the other of said receivers being used to receive signals from the next pipe in said first station in preparation for the next positioning of the films.

5. An apparatus as defined in claim 3, including a rail parallel to said support arm and carrying at least one X-ray device movable in accordance with actuation of the emitters.

* * * * *